(12) United States Patent
Chen et al.

(10) Patent No.: US 9,723,045 B2
(45) Date of Patent: Aug. 1, 2017

(54) COMMUNICATING TUPLES IN A MESSAGE

(71) Applicant: HEWLETT-PACKARD DEVELOPMENT COMPANY, L.P., Houston, TX (US)

(72) Inventors: Qiming Chen, Cupertino, CA (US); Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 122 days.

(21) Appl. No.: 14/435,685

(22) PCT Filed: Oct. 18, 2012

(86) PCT No.: PCT/US2012/060770
§ 371 (c)(1),
(2) Date: Apr. 14, 2015

(87) PCT Pub. No.: WO2014/062183
PCT Pub. Date: Apr. 24, 2014

(65) Prior Publication Data
US 2015/0271236 A1    Sep. 24, 2015

(51) Int. Cl.
*G06F 15/173*    (2006.01)
*H04L 29/06*    (2006.01)
(52) U.S. Cl.
CPC .................................. *H04L 65/602* (2013.01)
(58) Field of Classification Search
CPC ...................................................... H04L 65/602
USPC .................................................. 709/238, 223
See application file for complete search history.

(56) References Cited

U.S. PATENT DOCUMENTS

| 5,781,912 | A  | 7/1998 | Demers et al. |
| 5,870,761 | A  | 2/1999 | Demers et al. |
| 6,282,533 | B1 | 8/2001 | Ramaswamy et al. |
| 8,036,246 | B2 | 10/2011 | Makineni et al. |
| 2004/0233933 | A1* | 11/2004 | Munguia ............. H04L 12/4633 370/473 |
| 2009/0313614 | A1 | 12/2009 | Andrade et al. |
| 2011/0314019 | A1 | 12/2011 | Jimenez Peris et al. |

FOREIGN PATENT DOCUMENTS

| CN | 101088890 | 9/2007 |
| CN | 101593202 | 12/2009 |
| EP | 2259189 B1 | 5/2012 |
| WO | WO-2011162628 A2 | 12/2011 |

OTHER PUBLICATIONS

Lee et al, "Parallel Data Processing with MapReduce: A Survey", ACM SIGMOD Record archive vol. 40 Issue 4, Dec. 2011, pp. 11-20.
Adabi et al., The Design of the Borealis Stream Processing Engine, Proceedings of the 2005 CIDR Conference (13 pages).
(Continued)

*Primary Examiner* — Philip B Tran
(74) *Attorney, Agent, or Firm* — Trop, Pruner & Hu, P.C.

(57) ABSTRACT

Multiple tuples are combined (202) by a processing node into a message that has a key portion including a value of a key, and a payload including a relation containing content of the combined plurality of tuple. The message is sent (204) to a receiving node.

12 Claims, 2 Drawing Sheets

(56) References Cited

OTHER PUBLICATIONS

Andrade et al., Processing high data rate streams in System S, Article in Press, J. Parallel Distrib. Comput., 2010 (12 pages).
Arasu et al., The CQL Continuous Query Language: Semantic Foundations and Query Execution, Jun. 3, 2006 (32 pages).
Bryant, Data-Intensive Supercomputing: The Case for DISC, May 10, 2007 (23 pages).
Chandrasekaran, et al., TelegraphCQ: Continuous Dataflow Processing for an Uncertain World, 2003 CIDR Conference (12 pages).
Chen et al., Experience in Continuous analytics as a Service (CaaaS), Mar. 22-24, 2011 (6 pages).
Chen et al., Experience in Extending Query Engine for Continuous Analytics, HPL-2010-44 (12 pages).
Chierichetti, F. et al, "Max-Cover in Map-Reducing", Apr. 26-30, 2010.
Dean, J. et al, "MapReduce—Simplified Data Processing on Large Clusters", Dec. 2004.
Franklin et al., Continuous Analytics: Rethinking Query Processing in a Network-Effect World, CIDR Perspectives 2009 (6 pages).
Gulisano, V et al, "Streamcloud-An Elastic and Scalable Data Streaming System", 2012.
Isard et al., Dryad: Distributed Data-Parallel Programs from Sequential Building Blocks, Mar. 21-23, 2007 (14 pages).
Jeff Dean, Experiences with MapReduce, an Abstraction for Large-Scale Computation dated on or before Sep. 14, 2012 (43 pages).
Liarou et al., Exploiting the Power of Relational Databases for Efficient Stream Processing, Mar. 24-26, 2009 (12 pages).
Olston et al., Pig Latin: A Not-So-Foreign Language for Data Processing, Jun. 9-12, 2008 (12 pages).
www.zeromq.org/whitepapers:design-v03, OMQ Lightweight Messaging Kernal (v0.3) dated on or before Sep. 14, 2012 (10 pages).
International Search Report and Written Opinion of the International Searching Authority, mailed Jul. 31, 2013, issued in related PCT Application No. PCT/US2012/060770.

\* cited by examiner

COMMUNICATING TUPLES IN A MESSAGE

BACKGROUND

Data received from one or multiple data sources can be communicated as a stream. In some applications, it may be desirable to process the data stream in real-time. Processing data in real-time can involve processing the data on-the-fly without first storing the data into a data repository.

In scenarios where relatively large amounts of data are to be processed, a distributed system having multiple processing nodes can be provided to perform processing of different portions of a data stream in parallel.

BRIEF DESCRIPTION OF THE DRAWINGS

Some embodiments are described with respect to the following figures.

DETAILED DESCRIPTION

A data stream analytics system can include an arrangement of processing nodes to perform processing of a data stream. Different portions of the data stream can be distributed across the processing nodes for parallel processing, which enhances overall system throughput. Also, the processing nodes can be arranged in multiple stages, where a first stage having one or multiple processing nodes can perform first operations on the data stream. Results from the first stage can be provided to a next stage of one or multiple processing nodes, which can perform second operations on the results from the first stage. In some cases, there can be more than two stages in the data stream analytics system.

The processing nodes can be computers or processors that are linked together by an interconnect infrastructure. Each processing node can execute a stream operator that applies a respective operation on data received by the processing node. The stream operator executing in a processing node can apply some type of transformation on received data or can compute result data based on received data.

Figure 1:
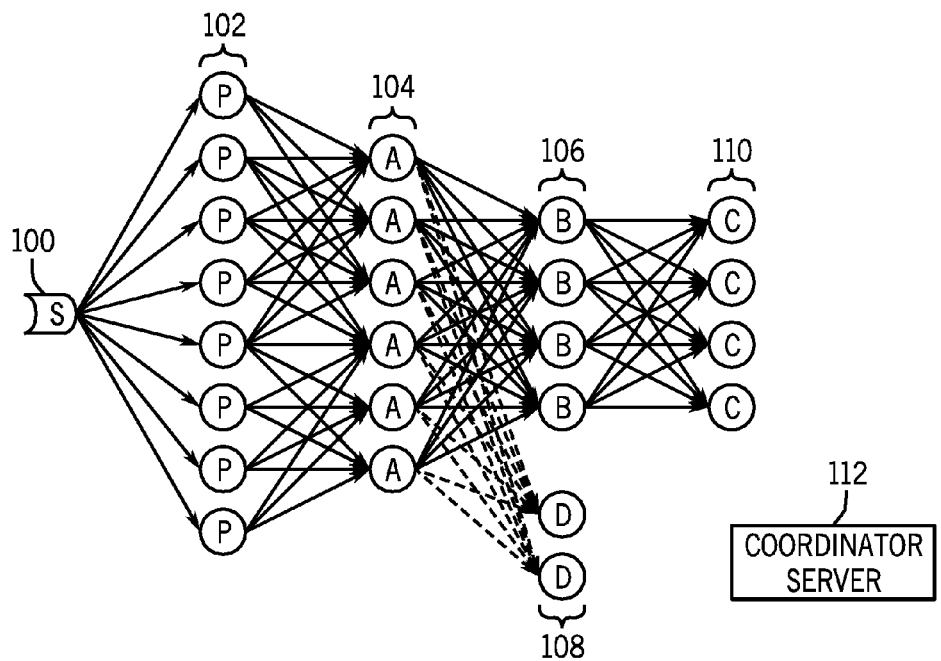
FIG. 1 is a block diagram of an example arrangement that includes processing nodes in a distributed stream analytics system, in accordance with some implementations.

FIG. 1 shows an example arrangement of processing nodes that are provided in multiple stages 102, 104, 106, 108, and 110. In the example of FIG. 1, each stage has multiple processing nodes (represented as circles). Within each processing node, a letter (P, A, B, D, and C shown in FIG. 1) represents a corresponding instance of a stream operator that executes in the processing node. The stream operators can be user-defined operators or predefined (pre-programmed) operators. A user-defined operator is an operator that can be created by a user and added to the distributed stream analytics system.

A data source 100 emits data that can be provided to the first stage 102. There can be various different types of the data source 100. For example, the data source 100 can be a sensor, a mobile device, a social networking data source, a data source in an enterprise (such as a business concern, educational organization, government agency, etc.), or any other data source. Although just one data source 100 is depicted in FIG. 1, it is noted that there can be multiple data sources in other examples.

Output data from the first stage 104 is provided to the downstream stage 104, which in turn outputs data to downstream stages 106 and 108. The stage 106 further outputs data to downstream stage 110. The arrangement of the stream operators (represented by P, A, B, D, and C in the example of FIG. 1) has a graph-structured topology, since data flow occurs from node to node along paths that can be represented by a graph. In the graph-structured topology, each stream operator can have multiple physical instances executing in respective processing nodes. In the example of FIG. 1, the P operator has eight physical instances, the A operator has six physical instances, the B operator and C operator each has four physical instances, and the D operator has two physical instances. The stream operator instances can pass messages to each other in a distributed way. In addition to performing parallel processing, the distributed streaming analytics system also is elastic since the number of physical instances of each stream operator can be varied based on demand.

In specific examples, the P operator can perform a parsing task for parsing event data from the data source 100 into tuples (described further below). The A operator can compute an aggregate (e.g. average) of a particular attribute, while the B operator can compute a moving average over a specific time window. The C operator and D operator can provide other operations. Although specific examples of the stream operators are provided, it is noted that in other implementations, different stream operators can be used. Also, even though the distributed stream analytics system of FIG. 1 has five stages, a different distributed stream analytics system can include a different number of stages.

In the ensuing discussion, reference is made to publisher operators and subscriber operators. A publisher operator is a stream operator that produces data that is to be sent for consumption by subscriber operator(s) subscribing to the data. A subscriber operator is a stream operator that receives data from another stream operator. In the example of FIG. 1, between stages 102 and 104, the processing nodes in the stage 102 include publisher operators, while the processing nodes in the stage 104 include subscriber operators. Similarly, between stages 104 and 106, the processing nodes in the stage 104 include publisher operators, and the processing nodes in the stage 106 include subscriber operators.

In addition, the distributed stream analytics system can also include a coordinator server 112 (or multiple coordinator servers). The coordinator server 112 is responsible for distributing logic (such as the stream operator instances) to the respective processing nodes. Also, the coordinator server 112 can assign additional tasks to the processing nodes. Additionally, the coordinator server 112 can monitor jobs executing on the processing nodes, and can monitor for failures.

Inter-node communication (communication of data from one processing node to another processing node) can be more costly (in terms of latency) than intra-node communication (communication of data within a processing node). To support inter-node communications with reduced latency when communicating a data stream, one possible solution is to deploy a relatively expensive and high-bandwidth interconnect infrastructure that has sufficient communications resources to allow for timely communication of data among the processing nodes. Such solution may lead to increased overall costs for an enterprise.

To improve inter-node communications performance without having to increase interconnect infrastructure investment, techniques or mechanisms according to some implementations can reduce the amount of messaging overhead associated with communication of data between processing nodes. Data can be carried in messages between processing nodes. A message can have a header and a payload, where the payload carries actual data whereas the header contains control information (e.g. information relating to a communications protocol and address information for routing the messages). A larger number of messages generally leads to increased messaging overhead since more header information has to be communicated, which consumes communications resources of an interconnect infrastructure.

To address the foregoing, when performing inter-node communications, multiple pieces of data can be combined (also referred to as "batched") into a message for communication from one processing node to another processing node. Communicating one message containing combined pieces of data is associated with reduced messaging overhead as compared to communicating multiple messages containing the respective pieces of data.

The multiple pieces of data that are batched are tuples of data. A tuple contains values for a respective set of attributes. For example, for data relating to employees of an enterprise, the attributes of a tuple can include an employee identifier, an employee name, a department identifier (to identify a department that the employee works in), and so forth. A given tuple can contain values of the employee identifier, the employee name, and the department identifier for a respective employee.

A data stream to be processed by a distributed streaming analytics system can be an unbounded sequence of tuples in some examples. The data stream can be a continuous real-time data flow of tuples that can be processed in real-time by the distributed streaming analytics system (where the logical operator instances are able to process the tuples of the data stream on-the-fly prior to storing the tuples into a persistent data repository).

In a distributed streaming analytics system having the graph-structured topology of FIG. 1, tuples of a data stream are partitioned across the stream operator instances within each stage for parallel processing. For example, in the stage 104, the A operator instances operate, in parallel, on respective different partitions of data output by the P operator instances.

In some implementations, the partitioning of data includes hash partitioning. Hash partitioning involves computing hashes based on corresponding values of a given key in the tuples, such as by applying a hash function on the values of the given key. The hashes identify respective partitions; in other words, a first hash value (or a first range of hash values) corresponds to a first partition, a second hash value (or second range of hash values) corresponds to a second partition, and so forth. Thus, for example, in the stage 104, data tuples of the first partition would be processed by a first A operator instance, data tuples of the second partition would be processed by a second A operator instance, and so forth.

To achieve efficient operation, data of a given partition should be consistently routed to the corresponding stream operator instance within a particular stage, such that the corresponding stream operator instance can process the data and possibly cache data of the given partition. If data of the given partition is routed to a different stream operator instance, then the data grouping semantic would not be achieved, which may lead to processing of a given piece of data by more than one processing node, which leads to inefficiency.

In accordance with some implementations, a group-wise batching of tuples of a data stream can be performed by a publisher operator instance in a processing node prior to the processing node sending the batch of tuples to a subscriber operator instance. The group-wise batching of tuples takes into account the partitioning of tuples that is performed in the distributed stream analytics system. In some implementations, tuples batched together are those that belong to the same group. The grouping of tuples is based on a key, which can include one or multiple attributes of the tuples. A group by operation performed on the key identifies a group of tuples sharing the same value of the key. For example, if a tuple includes attributes X, Y, and Z, and the key includes X, then the group by operation on the key X produces groups of tuples, where each group of tuples shares a common value of attribute X. In a different example, the key can include multiple attributes, such as X and Y.

The group-wise batching according to some implementations combines multiple tuples of a group into a single message (referred to herein as a "batch message") that can be sent from a publisher operator instance to a subscriber operator instance. The multiple tuples that are batched are placed in the payload of the batch message.

The batch message can include the following portions: a key portion containing the attribute(s) of the respective key, and a payload that includes the grouped tuples. The grouped tuples in the payload of the batch message can be provided in a relation (or table) that includes multiple rows containing respective ones of the tuples that have been batched into the batch message. In some examples, the relation can be a nested ordered relation, where the tuples in the relation are serialized and packed into the message in the order that the tuples were received in the data stream, and where the relation is nested in the sense that the relation depends on the key contained in the key portion of the batch message.

Note that the relation containing the combined tuples does not include the key attribute(s) that is (are) provided in the key portion of the batch message. Thus, the value of the key is stored just once in the key portion of the batch message, and is not duplicated in the relation. Such group-wise batching provides data compression, since duplication of the key value can be eliminated, which further improves interconnect infrastructure usage efficiency.

The key portion of the batch message exposes the attribute(s) of the key, such that a subscriber operator instance can perform appropriate processing of the batched tuples in the payload of the batch message. The subscriber operator instance receiving the batch message unpacks and deserializes the tuples in the nested ordered relation in the payload of the batch message.

As noted above, by incorporating a batch of tuples of the data stream into the payload of a single batch message, more efficient usage of an interconnect infrastructure between processing nodes can be achieved, since the amount of messaging overhead can be reduced. Additionally, by performing the group-wise batching according to some implementations, groups of data based on the appropriate keys can be directed to the correct subscriber operator instances, such that subscriber operator instances can process the groups of data without have to re-direct tuples to other subscriber operator instances on other processing nodes, which can be wasteful of communications bandwidth.

In some implementations, the coordinator server 112 can provide indications to publisher operators indicating respective groups of tuples that each subscriber operator is interested in (or has subscribed to). Alternatively, a subscriber operator instance can provide to a publisher operator instance an indication of a group of tuples that the subscriber operator instance is interested in (or has subscribed to).

Figure 2:
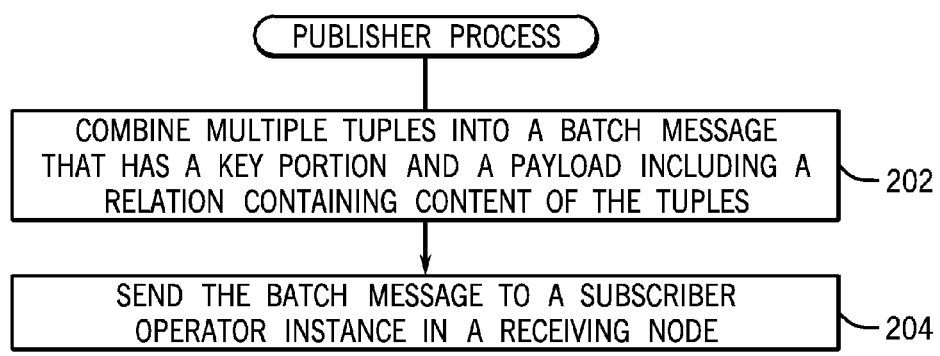
FIG. 2 is a flow diagram of a publisher process according to some implementations.

FIG. 2 is a flow diagram of a process that can be performed by a publisher operator instance in a processing node. The publisher operator instance combines (at 202) multiple tuples into a batch message that includes a key portion and a payload. The key portion includes key field(s) containing respective attribute(s) of the key in the multiple tuples. The payload includes a relation containing content of the combined multiple tuples. As noted above, the content of the tuples can be serialized and packed into the relation. The relation depends on the key since the relation contains content of the tuples that are grouped based on the key.

The publisher operator instance sends (at 204) the batch message to a subscriber operator instance in a receiving processing node. The batch message or another batch message can also be sent by the publisher operator instance to additional subscriber operator instances.

As shown in the example of FIG. 1, a publisher P operator can have one or multiple subscriber operators. The P operator in FIG. 1 has one subscriber operator, namely the A operator. Note that there are multiple physical instances of the P operator and multiple instances of the A operator, such that a given P operator instance can output tuples for consumption by A operator instances.

FIG. 1 also shows that the A operator has two different subscriber operators, namely the B and D operators. There are also multiple physical instances of each of the B and D operators. Thus, an A operator instance can output tuples for consumption by both B operator instances and D operator instances.

More generally, a publisher operator V can produce tuples that are consumed by subscriber operators $W_1, W_2, \ldots, W_k$, where $k \geq 1$. Note that there can be multiple physical instances of each of V and each of $W_1, W_2, \ldots, W_k$.

The subscriber operators $W_1, W_2, \ldots, W_k$ can have different data partitioning schema, which is explained below in the context of a traffic monitoring example. In a traffic monitoring system, data relating to vehicles on highways can be collected by sensors provided along the highways. In such example, the attributes of a tuple can include the following: a vehicle identifier to identify a vehicle, a timestamp attribute to indicate the time at which the corresponding data was collected, a speed attribute to indicate the speed of the vehicle, a highway attribute to identify the highway on which the data was collected, a direction attribute to indicate a direction of travel of the vehicle on the highway, a segment attribute to identify the segment of the highway for which the data was collected, and so forth.

It is assumed that the publisher operator V produces tuples having the following attributes: <highway, direction, segment, vehicle identifier, speed, timestamp>. In examples where the publisher operator V has multiple different subscriber operators, such as $W_1, W_2, W_3$, the different subscriber operators can specify different partitioning schemas.

For example, the subscriber operator $W_1$ specifies partitioning of tuples by a first subscriber-grouping key <highway, direction, segment>; $W_2$ specifies partitioning of tuples by a second subscriber-grouping key <highway, direction>; and $W_3$ specifies partitioning of tuples by a third subscriber-grouping key <highway, segment>.

At the publisher operator V, rather than perform multiple separate groupings of tuples using the three different subscriber-grouping keys when forming batch messages, the grouping performed is based on a publisher-grouping key. Thus, in forming a batch message, the publisher operator groups tuples by the publisher-grouping key to form respective groups, and combines the tuples of each group into a respective batch message. The batch message includes a key portion that includes the publisher-grouping key, and a payload that includes the combined tuples of the respective group.

In some implementations, the publisher-grouping key is the least upper bound (LUB) of the multiple subscriber-grouping keys. In the foregoing example where the three subscriber-grouping keys are <highway, direction, segment>, <highway, direction>, and <highway, segment>, the LUB of these subscriber-grouping keys is <highway, direction, segment>.

Thus, the key portion of a batch message includes key fields, e.g. $k_1, k_2, \ldots$, of the publisher-grouping key, and the payload of the batch message includes a nested ordered relation R.

In some examples, the nested ordered relation R can be an array data structure that has rows and columns, where the rows correspond to respective tuples that have been combined. The content of the array data structure can be delivered together in the batch message, and a subscriber operator can process the content of the array data structure in the order designated in the array data structure.

The array data structure thus provides for intra-group ordering (ordering within a group of tuples). In other examples, other types of data structures can be used for R in a batch message.

In some implementations, in addition to intra-group ordering, inter-group ordering can also be specified, such as by using a linked hash map. The linked hash map is a data structure that has entries corresponding to different groups, where the entries are linked together according to an order in which the entries were added to the data structure. The linked hash map can thus specify an ordering of groups of tuples, such that they can be processed in the correct order. The ordering between groups can be based on the arrival time of the first tuple within each group. In other examples, other data structures for maintaining inter-group ordering can be used.

The group-wise batching mechanism according to some implementations can be provided in addition to other forms of processing that are to be applied by the distributed streaming analytics system. Other forms of processing can include the horizontal partitioning of tuples across multiple stream operator instances as discussed above. In addition, another form of processing can include vertical partitioning along the time dimension, such that tuples can be divided into time windows. Tuples within a given time window are partitioned across the multiple stream operator instances.

Figure 3:
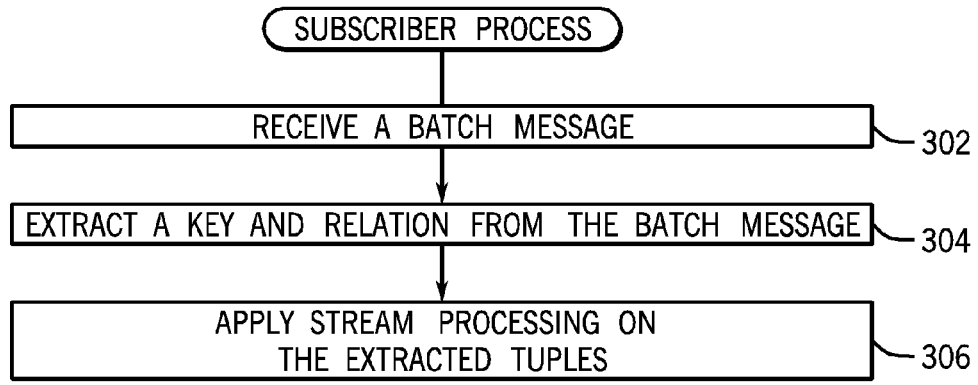
FIG. 3 is a flow diagram of a subscriber process according to some implementations.

FIG. 3 is a flow diagram of a process performed by a subscriber operator instance in a processing node. The subscriber operator instance receives (at 302) a batch message that has a key portion containing a key, and a payload containing a nested ordered relation (that includes combined tuples of a particular group based on the key). The subscriber operator instance then extracts (at 304) the key and the relation from the batch message, and unpacks and deserializes the tuples in the relation. Upon extraction, the subscriber operator instance applies (at 306) the respective stream processing on the extracted tuples.

Figure 4:
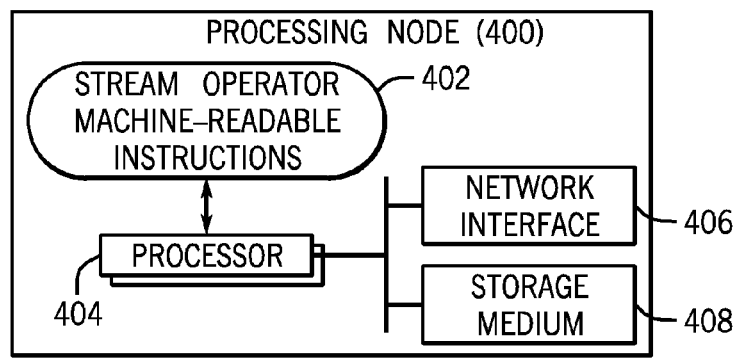
FIG. 4 is a block diagram of an example processing node according to some implementations.

FIG. 4 is a block diagram of an example processing node 400 according to some implementations. The processing node 400 includes stream operator machine-readable instructions 404 that can correspond to a stream operator instance. The stream operator machine-readable instructions 402 are executable on one or multiple processors 404. A processor can include a microprocessor, microcontroller, processor module or subsystem, programmable integrated circuit, programmable gate array, or another control or computing device.

The processor(s) 404 can be connected to a network interface 406 to allow for communication over a interconnect infrastructure. Additionally, the processor(s) 404 can be connected to a storage medium (or storage media) 408 to store information. In some cases, the storage medium 408 can include a cache to temporarily store tuples in a data stream received by the processing node 400.

The storage medium (or storage media) 408 can be implemented as computer-readable or machine-readable storage medium or media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
 combining, by a processing node, a plurality of tuples into a message that has a key portion including a value of a key, and a payload including a relation containing content of the combined plurality of tuples;
 sending, by the processing node to a first receiving node over a network, the message;
 receiving, by the processing node, an indication that the first receiving node is interested in output that includes a grouping of tuples based on the key, wherein the key is a first key having a first number of attributes;
 receiving, by the processing node, a second indication that a second receiving node is interested in output that includes a grouping of tuples based on a second key including a second number of attributes, the second number being less than the first number; and
 sending, by the processing node to the second receiving node, the message.

2. The method of claim 1, wherein the combining comprises combining the plurality of tuples that are grouped on the key.

3. The method of claim 2, wherein the plurality of tuples that are grouped on the key share the value of the key.

4. The method of claim 1, wherein the processing node executes a first operator instance, and the receiving node executes a second operator instance, wherein the first and second operator instances are part of a graph-structured topology that further includes additional operator instances.

5. The method of claim 1, wherein the first key and the second key included in the key portion of the message is a least upper bound of the first key and a least upper bound of the second key.

6. The method of claim 1, further comprising:
 sending, by the processing device to the receiving device, a map specifying ordering between multiple groups of tuples carried in corresponding messages from the processing device to the receiving device.

7. An article comprising at least one non-transitory computer readable storage medium storing instructions that upon execution cause a first processing node to:
 receive a batch message containing a key portion and a payload, the key portion including a value of a key, and the payload including a relation having a plurality of combined tuples that belong to a group corresponding to the value of the key; and
 extract the key value and the relation from the message, where the extracting includes retrieving the tuples from the relation for processing by the first processing node.

8. The article of claim 7, wherein the relation includes the tuples in an order of receipt of the tuples by a second processing node.

9. The article of claim 7, wherein the first processing node includes an instance of a subscriber operator that subscribes to a particular group of tuples from the second processing node.

10. The article of claim 9, wherein the particular group is defined on a subscriber-grouping key, and wherein the key in the batch message is a publisher-grouping key different from the subscriber-grouping key.

11. The article of claim 9, wherein the second processing node executes an instance of a publisher operator, and wherein the subscriber operator instance and publisher operator instance are part of a graph-structured topology provided by a distributed analytics system that includes multiple stages of operator instances.

12. A distributed analytics system comprising:
 a plurality of stages, wherein each of the stages includes at least one processing node to execute an operator instance on a stream of tuples, wherein a first of the plurality of stages outputs tuples for consumption by a second of the plurality of stages, and
 wherein a processing node in the first stage executes an operator instance to:
 combine a plurality of tuples into a message that has a first key portion having a first number of attributes including a value of a key, and a payload including a relation containing content of the combined plurality of tuples;
 send, to a first node executing an operator instance in the second stage, the message;
 receive an indication that the node executing the operator instance in the second stage is interested in output that includes a grouping of tuples based on the key;
 receive a second indication that a second node executing the operator instance in the second stage is interested in output that includes a grouping of tuples based on a second key including a second number of attributes, the second number being less than the first number; and send, to the second node executing the operator instance in the second stage, the message.

\* \* \* \* \*